UNITED STATES PATENT OFFICE.

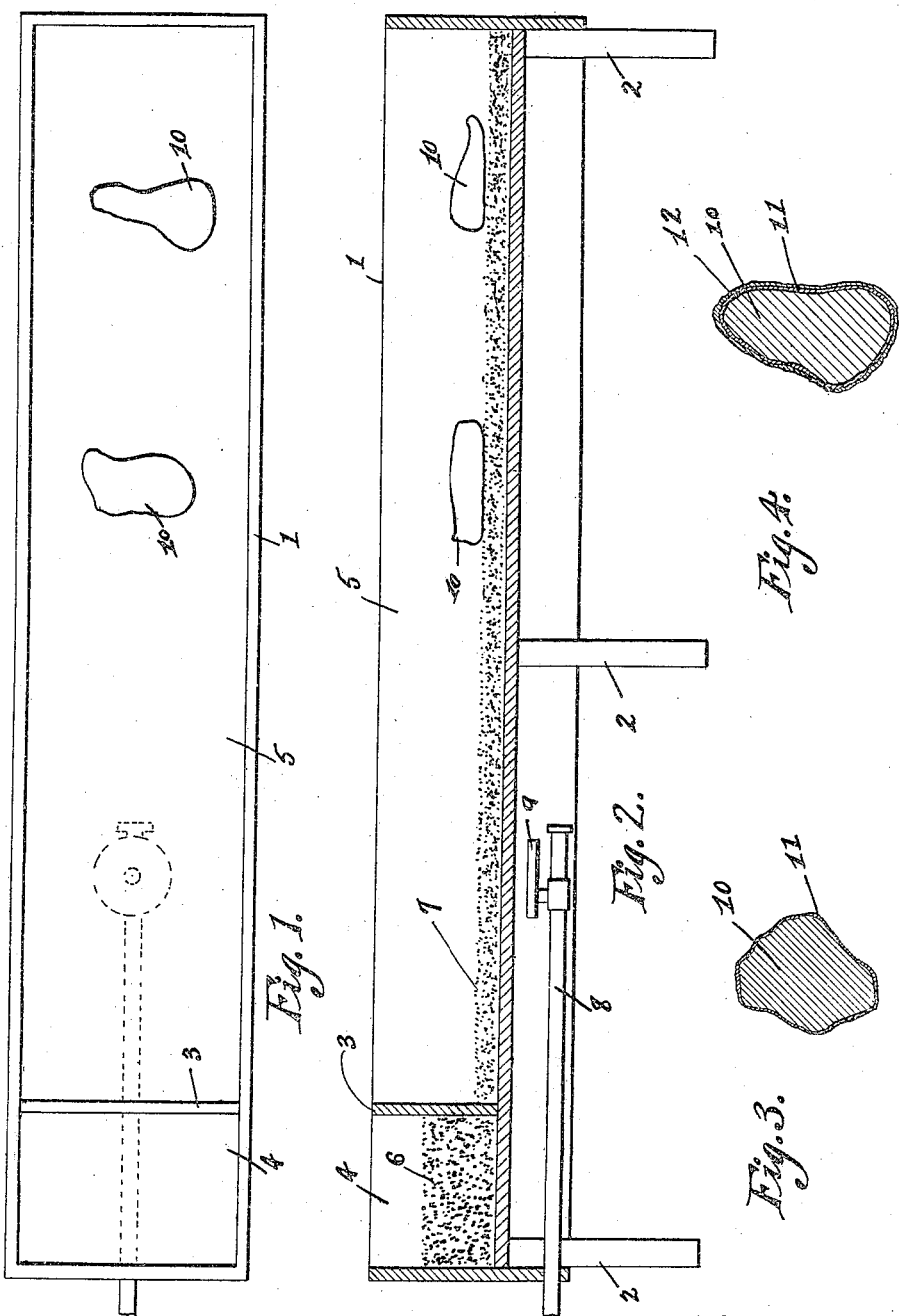

JAMES W. HAMMETT, OF EUREKA, WEST VIRGINIA.

MEAT-CURING PROCESS.

1,241,374. Specification of Letters Patent. Patented Sept. 25, 1917.

Application filed January 26, 1917. Serial No. 144,689.

*To all whom it may concern:*

Be it known that I, JAMES W. HAMMETT, a citizen of the United States, residing at Eureka, in the county of Pleasants and State of West Virginia, have invented a new and useful Meat-Curing Process, of which the following is a specification.

This application discloses a means for curing edible flesh, such as meat, fish and game, and the invention aims to provide novel means whereby the flesh may be cured, without a taint existing either during the process of curing, or after the process of curing has been completed.

By way of explanation it may be stated that after a piece of flesh has been cured in the usual way and has been hung up, a colorless liquid exudes upon the surface of the flesh, sometimes in the form of a coating of moisture, but generally in the form of drops or beads. The offensive character of this exuding liquid may be determined readily by a simple test, such as touching one of the drops or beads of the liquid with the tongue.

In view of the foregoing, the present invention aims to provide a process whereby flesh may be dry-cured, to avoid the taint above mentioned, and, particularly, to avoid the exuding liquid, which under the ordinary processes of curing, is present in and upon the flesh.

With the above and other objects in view, the process forming the subject matter of this application consists in various steps hereinafter set forth, used at once or in groups in combination.

In the accompanying drawings there is shown a simple apparatus whereby the process forming the subject matter of this application may be carried out.

In the said drawings:—

Figure 1 is a top plan of a trough in which the process hereinafter described may be carried out, parts being broken away;

Fig. 2 is a longitudinal section of the trough;

Fig. 3 is a cross section of a piece of edible flesh as it appears after one of the steps of the present process has been carried out; and Fig. 4 is a cross section of a piece of completely cured flesh, treated in accordance with the present process.

One apparatus, but not a mandatory one, whereby the process herein disclosed may be carried out, includes a trough 1 which may be supported on legs 2. The trough 1 has a cross partition 3 defining a compartment 4 and a compartment 5. In the compartment 4, a reserve supply of spice may be held, as shown at 6. The compartment 5 is partially filled with salt, as shown at 7. By "salt" I mean sodium chlorid in a dry condition. In order that the salt in the trough 1 may be kept dry, a burner pipe 8 is extended beneath the trough 1 and carries a burner which may be lighted at intervals, as the case may demand, in order that the salt in the trough 1 may be kept perfectly dry.

In carrying out the present process, chunks of meat indicated at 10 are placed in the compartment 5, on top of the dry salt 7 in the said compartment. The pieces 10 of meat are mounted in place as soon as they are cut up, and are spaced apart from each other, the meat never being packed tightly in bulk into the compartment 5. As soon as the pieces 10 of meat are placed in the compartment 5 on the salt 7, the pieces of meat are rubbed immediately with the dry salt 7, and are permitted to rest on the salt. This rubbing of the pieces 10 of meat with dry salt is repeated at intervals, and the intermittent rubbing is continued until no dampness or moisture appears on the surface of the meat. The meat should be rubbed in this way with dry salt at least once a day. When no dampness or moisture appears on the surface of the chunks of meat 10, no further rubbing with dry salt is required. The chunks 10 of meat thus appear as shown in Fig. 3, with a thin and almost imperceptible coating 11 of dry salt. The salted meat is now coated exteriorly, as shown at 12, with a finely ground, dry, pungent spice, such as common black pepper, although other spices from the compartment 4 may be employed to advantage.

The meat is now completely cured and treated, and may be hung away in a dry cool, comparatively dark and well ventilated place until occasion for the use of the meat arises.

Before the meat is cooked, it is dropped into a pan of cold water to wash off the exterior spice shown at 12.

Meat cured by the process above outlined will not be found to be oversalted and, further, it will be found to be entirely free from the exuding liquid hereinbefore alluded to.

If desired, the pipe 8 and the burner 9 may be omitted. Under such circumstances, the salt is heated exteriorly of the trough and not in the trough, the meat, in any event, being treated with salt which is thoroughly dry.

Having thus described the invention, what is claimed is:—

1. The hereindescribed process of curing edible flesh, which consists in supporting the flesh upon a mass of dry common salt; applying heat to the salt to keep the same dry; rubbing the dry salt into the flesh at intervals until no moisture appears on the surface of the flesh; and coating the salted flesh with a dry pungent spice.

2. The hereindescribed process of curing edible flesh, which consists in supporting the flesh upon a mass of dry common salt; applying heat to the salt to keep the same dry; and rubbing the dry salt into the flesh at intervals until no moisture appears on the surface of the flesh.

3. The hereindescribed process of curing edible flesh, which consists in supporting the flesh upon a mass of dry common salt; rubbing the dry salt into the flesh at intervals until no moisture appears on the surface of the flesh; and coating the salted flesh with a dry pungent spice.

4. The hereindescribed process of curing edible flesh, which consists in rubbing dry salt into the flesh at intervals until no moisture appears on the surface of the flesh; and coating the salted flesh with a dry pungent spice.

In testimony that I claim the foregoing as my own, I have hereto affixed my signature in the presence of two witnesses.

JAMES W. HAMMETT.

Witnesses:
H. E. BATTELLE,
M. E. HAMMETT.

Copies of this patent may be obtained for five cents each, by addressing the "Commissioner of Patents, Washington, D. C."